Nov. 1, 1932.   L. A. FISCHER   1,885,424
HYDRAULIC CONTROL FAUCET AND BALL COCK
Filed July 12, 1929    4 Sheets-Sheet 2
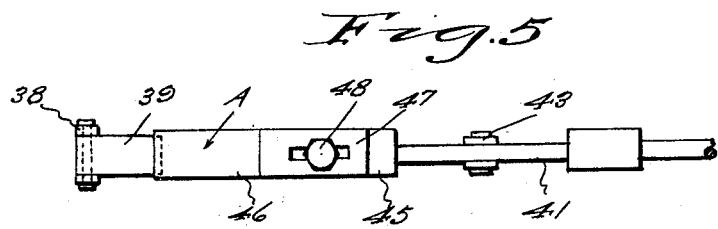
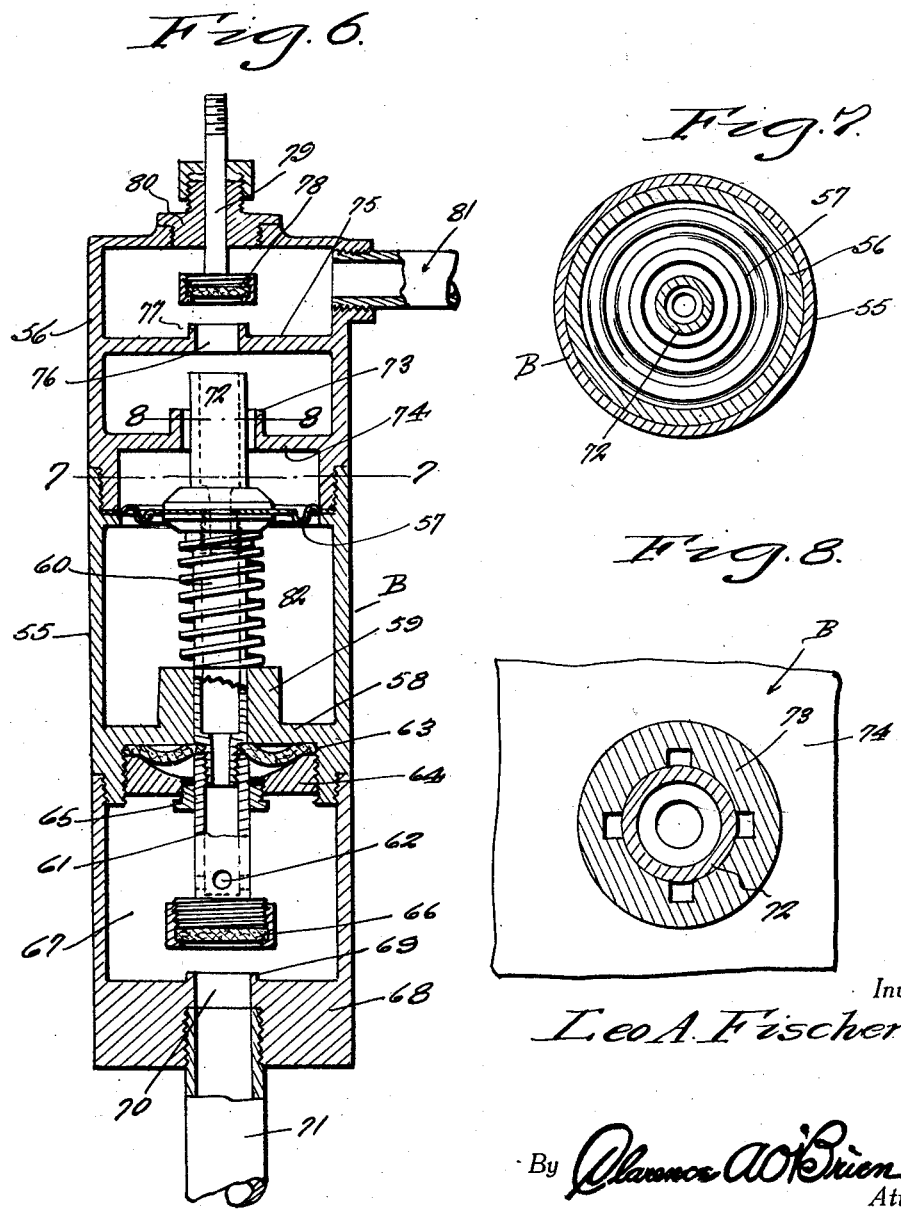
Inventor
Leo A. Fischer
By Clarence A. O'Brien
Attorney Nov. 1, 1932.  L. A. FISCHER  1,885,424
HYDRAULIC CONTROL FAUCET AND BALL COCK
Filed July 12, 1929  4 Sheets-Sheet 3
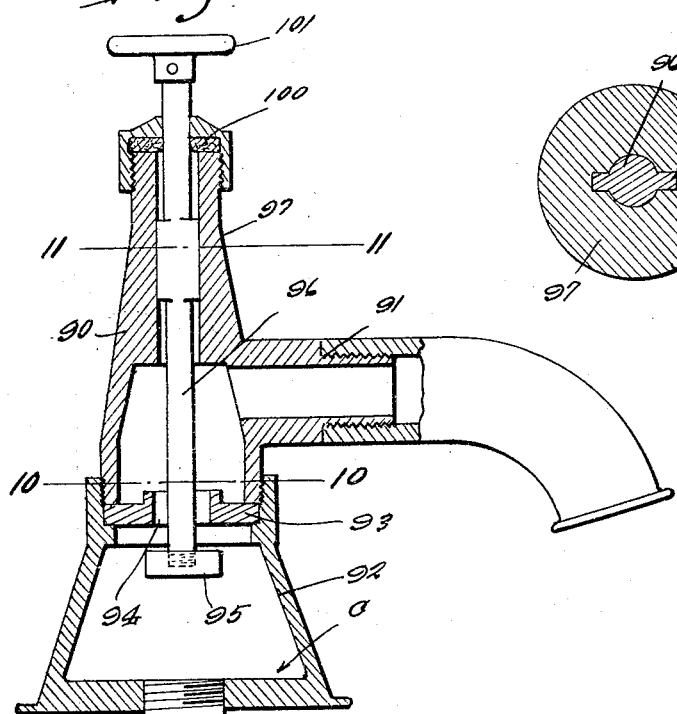
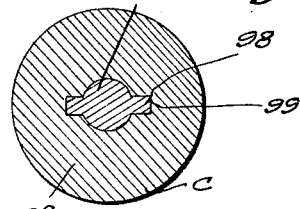
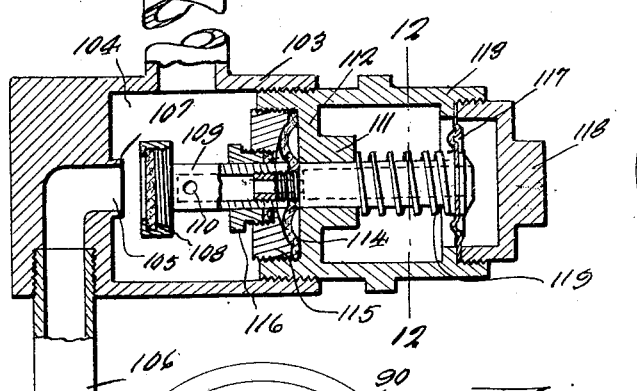
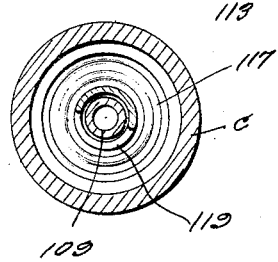
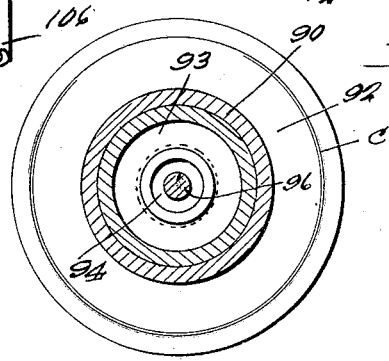
Inventor
Leo A. Fischer
By Clarence A. O'Brien
Attorney Nov. 1, 1932.  L. A. FISCHER  1,885,424
HYDRAULIC CONTROL FAUCET AND BALL COCK
Filed July 12, 1929  4 Sheets-Sheet 4

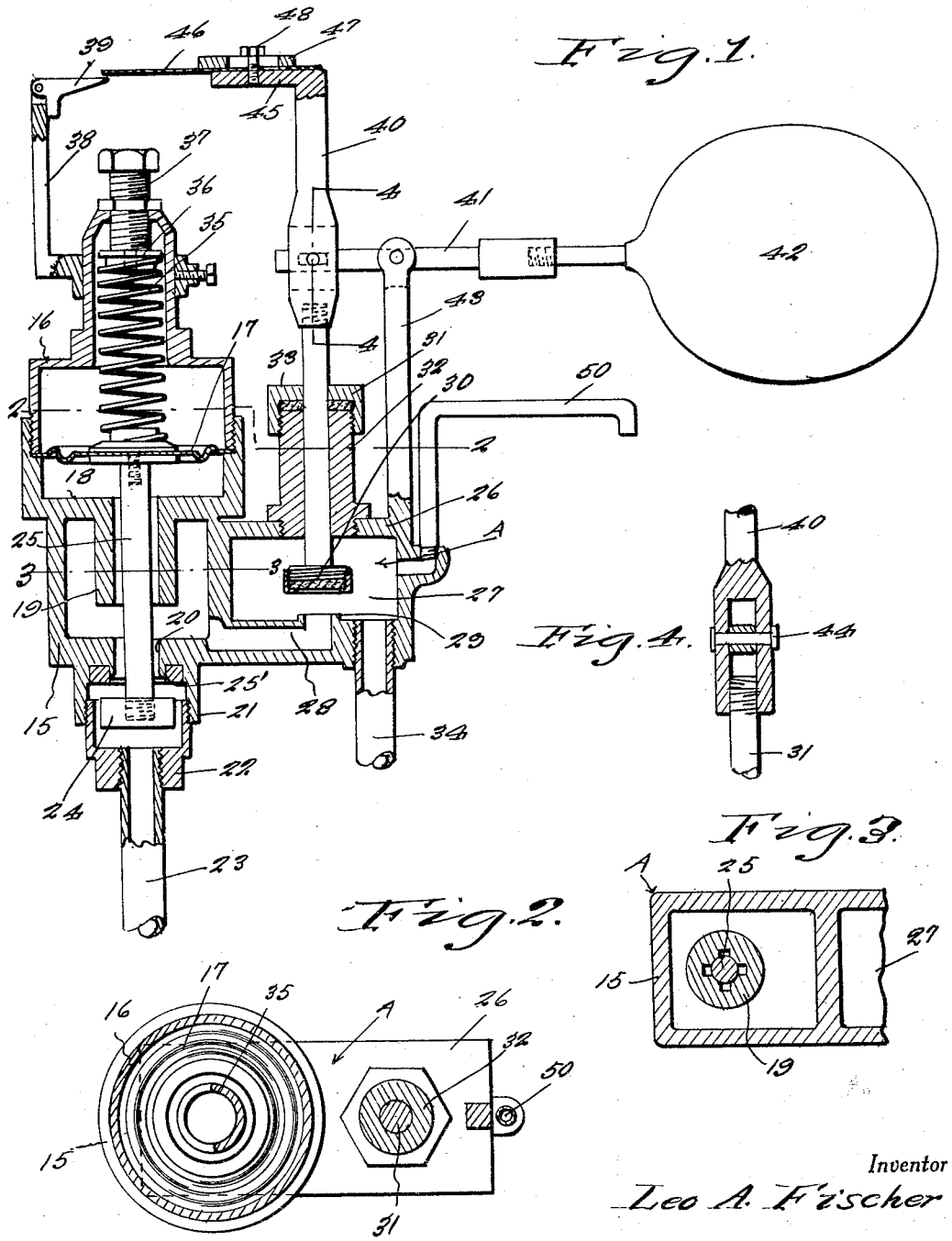

Inventor
Leo A. Fischer
By Clarence A. O'Brien
Attorney

Patented Nov. 1, 1932

1,885,424

UNITED STATES PATENT OFFICE

LEO A. FISCHER, OF SPRINGFIELD, OHIO

HYDRAULIC CONTROL FAUCET AND BALL COCK

Application filed July 12, 1929. Serial No. 377,761.

This invention appertains to water distribution and more particularly to hydraulic controlled valves.

One of the primary objects of my invention is to provide novel means for positively seating a valve by water pressure, the parts being so constructed and arranged as to operate automatically and positively hold the valve on its seat and preclude leakage.

Another important object of my invention is to provide a water faucet, in which the valve can be controlled by the pressure of the water, thereby insuring the easy opening and closing of the valve irrespective of the pressure of the water flowing through the faucet, thereby rendering the faucet positive in operation even when operated by children.

A further object of my invention is to provide a ball float valve for water closet tanks having novel means actuated by the float for controlling the direction of flow of the water, whereby the water will be either directed into the tank or to a pressure diaphragm according to the position of the float, the water acting on the diaphragm for closing the valves for cutting off the further flow of water into the tank.

A further object of my invention is to provide a hydraulically controlled valve which can be disposed in the main line pipe for a building and which functions to control the flow of water into the building according to the opening and closing of the ordinary faucet.

A still further object is to provide an improved hydraulic valve of the above character, which will be durable, and efficient in use, one that will be simple and easy to manufacture, and one which can be placed upon the market and incorporated with the plumbing fixtures of a building at a small cost.

With these and other objects in view, the invention consists in a novel construction, arrangement and formation of parts, as will be hereinafter more specifically described, claimed, and illustrated in the accompanying drawings, in which drawings:

Figure 1 is a longitudinal section through a ball float valve of water closet tanks embodying my invention.

Figure 2 is a horizontal section through the same taken on the line 2—2 of Figure 1.

Figure 3 is a fragmentary horizontal section taken on the line 3—3 of Figure 1.

Figure 4 is a detail vertical section taken on the line 4—4 of Figure 1, illustrating the connection between the float lever and the valve controlled thereby.

Figure 5 is a fragmentary top plan view illustrating the connection of the float operated lever with the valve stem and the trip carried thereby.

Figure 6 is a longitudinal section showing another form of my improved valve.

Figure 7 is a horizontal section through the same taken on the line 7—7 of Figure 6 showing the diaphragm in detail.

Figure 8 is a detail horizontal section taken on the line 8—8 of Figure 6 showing the upper guide for the main valve stem.

Figure 9 is a longitudinal section through a further modified form of my invention in which the hydraulic control can be arranged below the socket or outlet, Figure 10 is a horizontal section taken on the line 10—10 of Figure 9.

Figure 11 is a detail section taken on the line 11—11 of Figure 9 showing the guide on the valve stem utilized for controlling the direction of flow of the water.

Figure 12 is a detail vertical section taken on the line 12—12 of Figure 9 looking toward the diaphragm.

Figure 13:
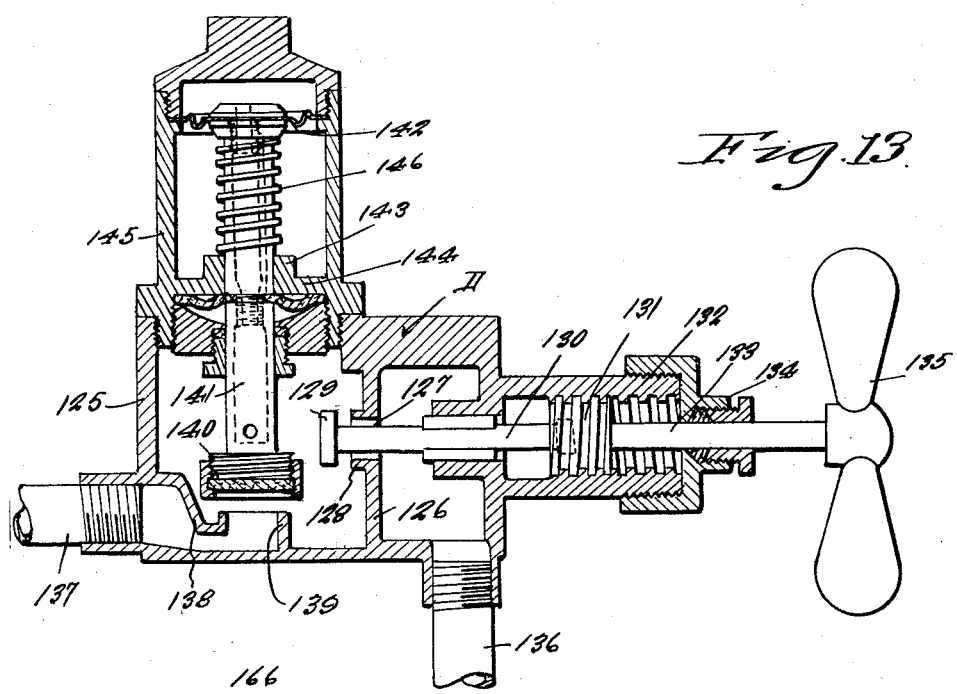
Figure 14:
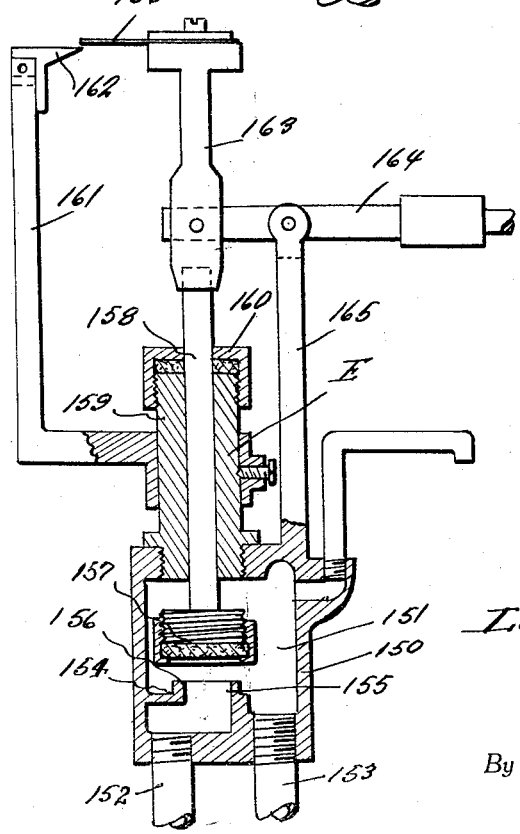

Figure 13 is a longitudinal section illustrating a still further modified form of my valve showing the hydraulic control arranged above the outlet and suitable for use with built in fixtures, and Figure 14 is a fragmentary vertical longitudinal section illustrating a float controlled valve for water closet tanks constructed in accordance with my invention, when the hydraulic control means is arranged remotely thereto.

Referring to the drawings in detail, wherein similar reference characters designate corresponding parts throughout the several views the letter A generally indicates one form of my improved device incorporated with a ball float for water closet tanks.

The improved device A comprises a valve casing 15 having threaded in its upper end a bonnet 16, which bonnet holds a diaphragm 17 horizontally across the casing 15. The casing 15 at a point intermediate its ends is provided with a horizontal partition 18 having a depending annular sleeve 19, which terminates short of the lower end of the casing 15 and above the inlet opening 20 formed therein.

Surrounding the inlet opening 20 is a depending internally threaded collar 21 receiving a cap 22 with which communicates the water supply pipe 23. The collar 21 and the cap 22 forms a housing for the main control valve 24 suitably secured to the valve stem 25 which extends axially through the inlet passage 20 and the sleeve 19.

As shown the upper end of the stem is connected axially with the diaphragm 17, for a purpose, which will be later described. Surrounding the inlet opening 20 is a suitable valve seat 25' against which the valve 24 is adapted to seat when the diaphragm 17 is forced upward by the water pressure, as will be hereinafter more fully explained.

The casing 15 is provided with a laterally extending enlargement or casing 26 having formed therein a water chamber 27, a passageway 28 being employed for connecting the chamber 27 with the casing 15. Surrounding the passage 28 in the chamber 27 is a valve seat 29 on which is adapted to fit an auxiliary valve 30 employed for controlling the direction of flow of the water and this valve is provided with an upwardly extending stem 31 slidably mounted in a guide barrel 32 threaded into the upper end of the enlargement 26. A suitable stuffing box 33 can be placed around the stem 31 to prevent the leakage of water past the same.

Communicating with and depending from the chamber 27 is the water outlet pipe 34 which can communicate with the exterior of the closet tank, (not shown).

Bearing against the upper face of the diaphragm 17 at its axial center is an expansion coil spring 35 and this spring normally functions to act against the normal pressure of water on the outer side of the diaphragm 17 and thus hold the valve 24 normally off of the seat 25'. The upper end of the spring 35 bears against a washer 36 and the washer in turn has impinging against the same an adjusting screw 37.

It is obvious that by adjusting the position of the screw 37 that the tension of the spring 35 can be controlled for governing the tension on the diaphragm 17 and the consequent closing of the valve 24 at different pressures.

A bracket 38 is suitably connected to the casing 15 and extends above the same and has pivotally secured to its upper end a trip 39 which terminates above the adjusting screw 37. The valve stem 31 has secured thereto an upwardly extending trip arm 40 and this arm adjacent to the stem 31 is bifurcated for the reception of the inner end of a float lever 41.

The outer end of the float lever has connected thereto in any preferred way the float 42 and this lever is rockably mounted at a point intermediate its ends upon a suitable arm 43 which may be connected with the chamber 26.

The inner end of the lever 41 is connected by means of pin and slot connection 44 to the trip arm 40, as clearly shown in Figure 4 of the drawings. The upper end of the trip arm 40 is provided with an inwardly directed foot 45 on which is placed a flat leaf spring 46 which is arranged in the path of the trip lug 39.

A slotted plate 47 is employed for connecting the spring 46 with the foot 45 and a screw 48 extends through the slot into said foot. It is obvious that by moving the plate 47 toward and away from the outer end of the leaf spring 46 that the tension or stiffness thereof can be governed.

In operation of my improved device the water enters through a pipe 23 into the valve casing 15 around the valve 24 and flows into the chamber 27 through the passage 28 and out through the pipe 34 into the closet tank. The water also can flow through the sleeve 19 about the valve stem 18 against the diaphragm 17, but the pressure of the water is insufficient to overcome the tension of the coil spring 35.

As the water fills the closet tank, the float 42 will rise causing the lowering of the valve stem 31 and the trip arm 40. This moves the spring 46 against the trip lug 39 which lug will temporarily hold the float valve against further movement. Upon the continued rise of the water the float will overcome the tension of the spring 46 forcing the same past the trip lug 39 and the float will seek the water level with a sudden impulse moving the valve 30 forcibly against the seat 29.

This will cut off further flow of the water into the chamber 27 and consequently the water will back up through the sleeve 19 against the diaphragm 17 and overcome the tension of the spring 35.

The upward movement of the diaphragm 17 carries the stem 25 therewith and moves the valve 24 on to its seat 25'. This shuts off any further flow of water from the supply pipe 23 into the casing 15. When the tank is emptied of water the float 42 lowers with the water and consequently lifts up on the stem 31 raising the valve 30 off of its seat 29 and allowing the relief of pressure against the diaphragm 17 and permitting the flow of water through the pipe 34.

Upon the lifting of the stem 31 the trip arm 40 rises therewith and the spring 46 moves past the pivoted trip lug 39 which raises therewith and drops past the same after the spring moves a predetermined distance above the pivot point thereof.

If desired the chamber 27 can have communicating therewith a refill pipe 50 as clearly shown in Figure 1. In Figures 6 to 8 inclusive I have shown another form of my invention which can be utilized either for faucets or float control closets flush tanks and this form of my invention is generally indicated by the reference character C.

This form of my invention includes a central valve casing 55 having threaded into its upper end a hollow head 56 which is utilized for securing a flexible diaphragm 57 across the upper end of the valve casing. The lower end of the casing 55 is provided with a partition wall 58 having an axial sleeve 59 in which is slidably mounted a hollow push rod 60.

The lower end of the hollow push rod 60 has secured thereto and communicating therewith a hollow valve stem 61 the lower end of which is provided with inlet ports 62. The connection between the push rods 60 and the hollow valve stem 61 provides means for permitting the connection of a flexible sealing washer 63 with the push rod and valve stem and a suitable packing nut 64 is threaded into the lower end of the casing against the flexible washer at its periphery for preventing the entrance of the water into the valve casing.

A packing gasket 65 is carried by the nut 64 and extends about the stem 61 and functions to permit the sliding of the stem relative to said nut 64. The stem 61 has secured to its lower end a suitable valve 66 and this valve is arranged in a chamber 67 formed in a lower valve body casing 68 and the valve is adapted to seat on an annular seat 69 formed in said valve casing for controlling the flow of water through the inlet port 70.

The inlet port 70 has communicating therewith a water supply pipe 71. The upper end of the hollow push rod 60 is connected with the diaphragm 57 and the upper surface of the diaphragm 57 has connected therewith a short length tube 72 which communicates with the hollow push rod 60.

The tube 72 extends through a collar 73 formed axially on a partition 74 formed in the cap 56. The cap 56 has a second partition 75 formed horizontally therein above and in spaced relation to the first partition 74. The second partition 75 is provided at its axial center with a port 76 surrounded by a valve seat 77 on which is adapted to fit a valve 78.

This valve 78 is provided with a stem 79 slidably extending through a closure plug or bonnet 8. This stem 79 can either be controlled manually or by a float, as is readily apparent to those skilled in the art. The head 56 has communicating with the interior thereof above the second partition 75, the outlet pipe 81 which can lead to any desired point, such as into a water closet tank.

In operation of this form of my invention the water enters into the lower valve casing 67 through the inlet 70 and flows around the valve 66 and into the ports 62. The water then flows through the valve stem 61, the hollow push rod 60 and the tube 72, through the port 76, and out the pipe 81.

The water will also fill the head 56 around the upper face of the diaphragm 57 but not with sufficient pressure to overcome the tension of the expansion coil spring 82 which is placed about the push rod 60. This spring normally bears against the lower face of the diaphragm 57 and against the sleeve 59. When the valve is 78 moved on its seat 77 the water is prevented from flowing out through the pipe 81 and consequently the full pressure of the water is exerted on the diaphragm 57 forcing the same downward.

Downward movement of the diaphragm 57 will slide the stem 61 in a downward path and move the valve 66 onto its seat 69 preventing the further entrance of water into the valve casing. As soon as the valve 78 is moved from its seat, the water is permitted to again flow through the pipe 81 and the pressure of the water will move the valve 66 from off of its seat 69 and the valve will function as described above.

In Figures 9 to 12 inclusive I have shown a still further form of my invention in which the hydraulic control function of my device can be arranged below the usual spigot, either directly below the same or at a point remote therefrom.

This form of my device is generally indicated by the reference character C and includes a faucet body 90 having communicating therewith at a point intermediate its ends, the outlet nozzle 91. The lower end of the body 90 is threaded into a casing 92 and a valve plate 93 is held in a horizontal position between the casing 92 and the faucet body 90.

This valve plate is provided with an axial port 94, the lower face of which forms a valve seat. A valve 95 is adapted to fit upon the seat and is provided with a stem 96 which extends axially through the port 94.

The upper end of the faucet body 90 is provided with an elongated guide barrel 97 which slidably receives the stem. The sides of the stem 96 can be provided with wings 98 for fitting in guideways 99 formed in the sides of the bore of the barrel 97. The upper end of the barrel receives a packing gland 100 through which slidably extends the valve stem 96 and the extreme upper end of the stem can be provided with a manipulating handle 101.

The lower end of the casing 92 has communicating therewith a supply pipe 102 which leads from the casing 103 of the hydraulic control device. The casing 103 has formed therein a chamber 104 and the pipe 102 communicates with the chamber at a point intermediate its ends. The inner end of the chamber is provided with an inlet port 105 with which communicates the main water supply pipe 106.

An annular valve seat 107 surrounds the inlet port 105 and a valve 108 is adapted to fit upon said seat. A hollow valve stem 109 is connected with the valve 108 and is provided with inlet ports 110. This stem slidably extends through a sleeve 111 formed axially on a partition wall 12 carried by a bonnet 113 which is threaded into the outer end of the casing 103.

The valve stem carries a flexible washer 114 against which presses a nut 115 for holding the outer edge of the washer tightly against the partition wall 112 to prevent the escape of water from the casing 103 into the bonnet.

The nut 115 carries a packing gland 116 through which slidably extends the valve stem 109. The outer end of the hollow valve stem 109 is secured to a diaphragm 117 which is held in place by closure cap 118. The bore of the hollow stem communicates with the inner portion of the cap for permitting water to flow on the inside of the diaphragm 117 as will now be described.

In operation of this form of my device the water normally enters through the pipe 106 into the casing 103 and into the casing 92 of the faucet. If the valve 95 is pushed off its seat the water flows through the port 94 out of the nozzle 91. If the valve is moved on to its seat, the water under pressure will flow into the hollow valve stem 109 through the port 110 and into the cap 118 and against the diaphragm 117. The pressure of the water is now sufficient to overcome the coil spring 119 which is placed about the hollow stem and normally bears against the inner face of the diaphragm 117 and the collar 111.

The pressure on the diaphragm 117 will slide the valve stem 109 inward and seat the valve 108. This will consequently shut off the further flow of water into the casing 103. Upon moving of the valve 95 off of the seat the pressure will be relieved from against the outer face of the diaphragm 117 again allowing the spring 19 to unseat the valve 108 allowing the free flow of water through the bonnet.

In Figure 13 I have illustrated a still further modified form of my invention which can be utilized for plumbing fixtures of the concealed type and this form is generally indicated by the reference character D.

This form also embodies a casing indicated by the reference character 125 and the same is divided vertically by a partition 126 having a port 127. The inner face of the port 127 is provided with a valve seat 128 against which is adapted to fit and manually control the valve 129.

The valve 129 is carried by the valve stem 130 which is connected with a screw plug 131 mounted in a threaded sleeve 132 formed on the casing 125. The plug 131 has connected therewith an operating rod 133 which extends through a packing gland 134 carried by said sleeve.

The outer end of the rod 133 has secured thereto a suitable handle 135 for threading the plug 131 in the sleeve for moving the valve 129 from and to its seat. The casing 125 has communicating therewith on the outer side of the partition wall 126 an outlet pipe 136, while the casing on the other side of the partition has communicating therewith the inlet pipe 137.

This pipe communicates the casing below a partition 138 which is provided with a port 139 for establishing communication with the interior of the casing and this port is provided with a valve seat against which is adapted to fit the main valve 140.

The main valve 140 carries a sliding hollow stem 141 the upper end of which is connected with a diaphragm 142. This stem slidably extends through a collar 143 formed axially on a partition 144 carried by the lower end of the bonnet 145 which is threaded into the upper end of the casing 125.

This form of the device operates substantially as the previous forms described and it is obvious that when the valve 129 is moved on its seat 128 that water under pressure will flow through the valve stem above the diaphragm 142 and the water pressure will force the valve stem down against the tension of the expansion spring 146 which bears against the lower face of the diaphragm.

This will move the valve onto its seat 139 and prevents further flow of water into the casing. In Figure 14 I have illustrated a float valve E which can be used in lieu of the faucet shown in Figure 9 of the drawings, that is the float valve can be used with the hydraulic control shown in Figure 9 when the same is arranged at a remote point.

In this form of a float valve the same includes a casing 150 provided with an interior chamber 151 having inlet and outlet pipes 152 and 153 communicating therewith. A partition 154 is arranged above the inlet pipe and is provided with a port 155 for establishing communication between the pipe 152 and the chamber 151.

A valve seat 156 surrounds the port and a main valve 157 is adapted to fit upon said seat. A valve stem 158 is connected with the valve and slidably extends through a bonnet 159 which is connected with the upper end of the casing 150. This stem can extend through a suitable packing gland 160 carried by the bonnet. A bracket 161 can be connected with the bonnet and forms means for pivotally supporting the trip 162.

The upper end of the stem 158 is connected with the trip arm 163 which is in turn operatively connected to the float lever 164.

This lever 164 is rockably mounted at a point intermediate its ends upon a post 165 which can be connected with the valve casing. The upper end of the trip arm 163 carries a leaf spring 166 for operation with the trip lug 162. The trip lug, frame and float lever operates in the same manner as the form illustrated in Figure 1 of the drawings and it is obvious that when the valve 157 is moved onto its seat that flow of water into the casing is precluded and which will permit the pressure of the water to act on the diaphragm 117 as illustrated in Figure 9 of the drawings.

From the foregoing description, it can be seen that I have provided an improved valve device which can be positively moved onto its seat by water pressure.

Changes in details may be made without departing from the spirit or the scope of this invention.

Having thus described my invention, what I claim as new is:

1. In a device of the class described, a casing having a port, a valve for controlling said port, a stem connected with said valve, a trip arm on said stem, a pivoted float lever connected with the trip arm, a float on said lever, a pivoted trip lug, and a resilient trip arm carried by the first mentioned trip arm and disposed in the path of the trip lug.

2. In a device of the class described, a casing having a port, a valve for controlling said port, a stem connected with said valve, a trip arm on said stem, a pivoted float lever connected with the trip arm, a float on said lever, a pivoted trip lug, and a resilient trip arm carried by the first mentioned trip arm and disposed in the path of the trip lug, and means for varying the tension of said resilient trip arm.

In testimony whereof I affix my signature.

LEO A. FISCHER.